United States Patent [19]

Hayashihara et al.

[11] Patent Number: 5,824,715
[45] Date of Patent: Oct. 20, 1998

[54] MARKING COMPOSITION AND LASER MARKING METHOD

[75] Inventors: Shoiti Hayashihara, yono; Masaru Kudo, Omiya; Masaki Shinmoto, Yono, all of Japan

[73] Assignee: Nippon Kayaku Kabushiki Kaisha, Tokyo, Japan

[21] Appl. No.: 592,424

[22] PCT Filed: Jul. 7, 1994

[86] PCT No.: PCT/JP94/01108

§ 371 Date: Feb. 6, 1996

§ 102(e) Date: Feb. 6, 1996

[87] PCT Pub. No.: WO96/00262

PCT Pub. Date: Apr. 1, 1996

[30] Foreign Application Priority Data

Jun. 24, 1994 [JP] Japan .................................. 6-164809

[51] Int. Cl.⁶ ...................................................... C08F 2/46
[52] U.S. Cl. ............................ 522/14; 347/139; 522/16; 522/26; 522/103
[58] Field of Search .............................. 347/139; 522/14, 522/16, 26, 103

[56] References Cited

U.S. PATENT DOCUMENTS

| | | | |
|---|---|---|---|
| 4,500,354 | 2/1985 | Katsen | 106/21 |
| 4,663,642 | 5/1987 | Kameda | 346/217 |
| 4,665,410 | 5/1987 | Iiyama | 346/204 |
| 4,965,127 | 10/1990 | Ebe | 428/343 |
| 4,985,394 | 1/1991 | Mori | 503/226 |
| 5,096,873 | 3/1992 | Minami | 503/216 |
| 5,151,403 | 9/1992 | Suzuki | 503/200 |
| 5,294,587 | 3/1994 | Nakagami | 503/204 |
| 5,434,119 | 7/1995 | Satake | 503/216 |
| 5,646,088 | 7/1997 | Hada | 503/209 |

*Primary Examiner*—Paul R. Michl
*Attorney, Agent, or Firm*—Nields, Lemack & Dingman

[57] ABSTRACT

A marking composition comprising an energy ray curing resin, a leuco dye and a color developer both of which are low in solubility in toluene, which composition is capable of forming a vivid black color on irradiation with laser beams, and a laser marking method for forming a clear-cut black-colored mark by using the above composition.

8 Claims, No Drawings

MARKING COMPOSITION AND LASER MARKING METHOD

TECHNICAL FIELD

The present invention relates to a marking composition for forming a clear-cut mark on the surface of a molded article by laser beam irradiation, and a laser marking method using such a composition.

BACKGROUND ART

Recently, as means for marking letters and signs such as marker's name, product name, date of production, lot number, etc., on the surfaces of various commercial products, for example, electronic parts such as IC's, resistors, condensors, inductors, etc., electrical parts such as relays, switches, connectors, printed circuit boards, etc., housings of the electrical devices, automobile parts, machine parts, cables, sheets, packaging sheets, cards, labels, various containers of foods and medicines, caps of containers, etc., the printing method using a marking ink has been employed popularly. This method, however, has involved the problems such as requiring a long time for completing the process from printing to drying of the ink, difficulty in marking on a small part, complexity for maintenance and management of print quality, high cost, etc., and improvements on these matters have been required.

For more rational and efficient marking, there has been deviced and practically used a laser marking method in which laser beams are directly applied to the surface of an object to be marked, such as a machine part, so as to etch a part of the object surface by means of thermal decomposition or vaporization to thereby accomplish desired marking. However, this marking method still has the problems such as inability to form a clear-cut mark on an object made of a certain type of material and difficulty in giving a vivid mark on a tinted object. Thus, this conventional marking technique can not adapt itself to all types of material that may be used for the commercial products.

As a solution to the above problems, a method has been proposed in which an ultraviolet curing resin, which is capable of laser marking, is coated on the surface of an object to be marked, such as an electronic or electric part, housing, package, etc., and after the resin coating has been cured, laser beams are applied thereto to thereby effect desired marking by etching the resin. This method has the advantage that the whole process can be completed in a short time, that it allows marking on a small article, and that the marks formed are of high quality. However, this method also has the disadvantage in that in case a commercial ultraviolet curing resin is used, the formed mark may be effaced due to, for instance, adhesion of an oil when the object to be marked is of a specific type. Further, in case the ink used was of the type which develops a color, especially a black color on laser irradiation, a compound containing a heavy metal such as lead has been employed as color former, but use of such compound involves the problem of environmental pollution by the heavy metal contained in the compound and the problem of unclear marking. As a compound capable of forming a black color without using a heavy metal that may cause environmental pollution, a system comprising a leuco dye, which is known as a useful material for thermal recording, and a color developer appears useful, but when a system comprising such leuco dye and color developer is applied to an ultraviolet curing resin, there arises the problem that the color is developed gradually even with no laser beams being applied (this phenomenon is hereinafter referred to as discoloration of the ground).

DISCLOSURE OF INVENTION

The present inventors have made researches on a laser marking composition containing an ultraviolet curing resin, which composition is capable of suppressing or minimizing discoloration of the ground even when incorporated with a system comprising a leuco dye and a color developer, and can develop a vivid black color and form a mark with excellent color fastness. As a result, it was found that a marking composition which meets said requirements can be obtained by using a leuco dye with low solubility in toluene, particularly a solubility below 5 w/v % at 25° C., and a color developer which is also low in solubility in toluene. The present invention has been attained on the basis of this finding.

The present invention is also envisaged to provide a laser marking method according to which it is possible to form a clear-cut mark by using said marking composition.

BEST MODE FOR CARRYING OUT THE INVENTION

Specifically, the present invention schemes to provide:

(1) A marking composition comprising a resin curable with rays of energy (hereinafter referred to as energy ray curing resin), a leuco dye with low solubility in toluene and a color developer.

(2) A marking composition as set forth in (1) above, wherein the energy ray curing resin is an ultraviolet curing resin.

(3) A marking composition as set forth in (1) above, wherein the leuco dye with low solubility in toluene is one whose solubility in toluene at 25° C. is 5 w/v % or below.

(4) A marking composition as set forth in (1) or (3) above, wherein the leuco dye is a fluoran compound represented by the formula (1):

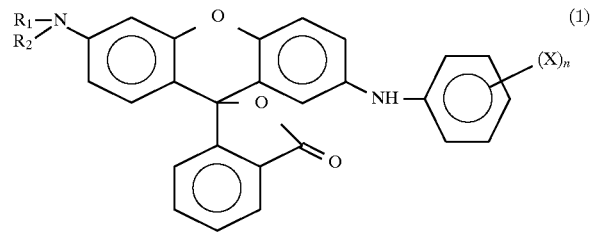

wherein $R_1$ and $R_2$ are methyl or ethyl group; X is fluorine or chlorine; and n is an integer of 0 to 2.

(5) A marking composition as set forth in (1) or (3) above, wherein the leuco dye is 2,2-bis(4-(6'-(N-cyclohexyl-N-methylamino)-3'-methylspiro(phthalide-3,9'-xanthene)-2'-ylamino)phenyl)propane.

(6) A marking composition as set forth in (1) above, wherein the color developer is one with low solubility in toluene.

(7) A marking composition as set forth in (6) above, wherein the color developer with low solubility in toluene is one whose solubility in toluene at 65° C. is 10,000 ppm or below.

(8) A marking composition as set forth in (7) above, wherein the color developer whose solubility in toluene at 65° C. is 10,000 ppm or below is a sulphonylphenol type color developer, a methylenebisphenol type color developer or a phenol polymer.

(9) A marking composition as set forth in (7) above, wherein the color developer whose solubility in toluene at 65° C. is 10,000 ppm or below is a 4,4'-sulphonyldiphenol type color developer having a substituent or a phenol polymer.

(10) A marking composition as set forth in (9) above, wherein the substituent of the 4,4'-sulphonyldiphenol type color developer having a substituent is alkyl, halogen atom or allyl.

(11) A marking composition as set forth in (1) above, wherein the color developer is one with low solubility in toluene, with solubility in water at 25° C. being 3 ppm or below.

(12) A marking composition as set forth in (11) above, wherein the color developer with low solubility in toluene, with solubility in water at 25° C. being 3 ppm or below is 2,2',6,6'-tetramethyl-4,4'-sulphonyldiphenol, 2,2',6,6'-tetrabromo-4,4'-sulphonyldiphenol or a phenol polymer.

(13) A marking composition as set forth in (12) above, wherein the phenol polymer is a poly-p-vinylphenol.

(14) A marking composition containing at least one of ultraviolet curing resin, leuco dye set forth in (4) above and color developer set forth in (12) above.

(15) A marking composition containing at least one of ultraviolet curing resin, leuco dye set forth in (5) above and color developer set forth in (12) above.

(16) A laser marking method characterized in that laser beams are applied to the cured coating layer of a marking composition set forth in (1), (14) or (15) above, which has been coated on the surface of an article to be marked.

(17) A laser marking method as set forth in (16) above, wherein the article is a bottle, cap, card, label or can.

(18) A color-developing composition containing a leuco dye and a color developer, wherein the color developer is 2,2',6,6'-tetramethyl-4,4'-sulphonyldiphenol, 2,2',6,6'-tetrabromo-4,4'-sulphonyldiphenol or a poly-p-vinylphenol.

The energy ray curing resin used in this invention may be of any type as far as it can be cured with energy rays such as infrared rays, visible light rays, ultraviolet rays, electron beam, etc., preferably with ultraviolet rays. Typical examples of such resins are radical polymerization type resins and cationic polymerization type resins, the former type being preferred.

The radical polymerization type resins usable in this invention include various types of acrylate monomers and oligomers such as polyether type, unsaturated polyester type, epoxy type, urethane type, polybutadiene type, polyacetal type and polyester/urethane type acrylate monomers and oligomers. Examples of the acrylate monomers include trimethylolpropanetriacrylate, dipentaerythritol pentacrylate, trimethylolpropane ethoxytriacrylate, trimethylolpropane propoxytriacrylate, tripropylene glycol ethoxydiacrylate, neopentyl glycol alkoxydiacrylate, neopentyl glycol propoxydiacrylate, tripropylene glycol diacrylate, polyethylene glycol diacrylate, bisphenol A ethoxydiacrylate, bisphenol A propoxydiacrylate,1,6-hexanediol diacrylate, 1,4-butanediol diacrylate, stearyl acrylate, phenolethoxy monoacrylate, nonylphenol ethoxymonoacrylate, 2-phenoxyethyl acrylate, monomethoxytripropylene glycol monoacrylate, monomethoxyneopentyl glycol propoxymonoacrylate, monomethoxytrimethylolpropane ethoxydiacrylate, dicyclopentenyloxyethyl acrylate, and dicyclopentenyl acrylate. Examples of the acrylate oligomers are epoxy acrylate oligomers such as epoxylated soybean oil acrylates, acrylates having various types of bisphenol A epoxy resins as base, epoxylated linseed oil acrylates and modified bisphenol A diacrylates; polyester acrylate oligomers such as the reaction products of acrylic acid and polyesters having as base a dibasic acid and an aliphatic diol, such as represented by the following formula (3):

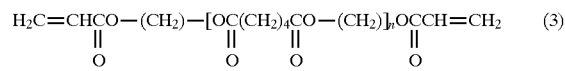

and aliphatic or aromatic urethane acrylates obtained from the reaction between aliphatic or aromatic isocyanates and a polyol or polyester, such as represented by the following formula (4):

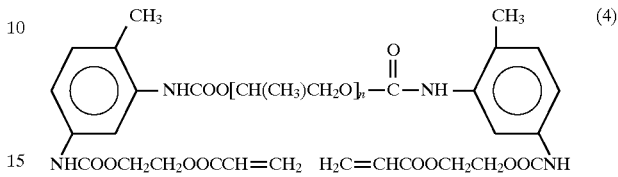

The cationic polymerization type resins usable in the present invention include various types of aliphatic, alicyclic and aromatic epoxy resins, but acrylates of monohydric and polyhydric alcohols, epoxy resin type acrylates, urethane type acrylate monomers and oligomers thereof are preferred.

In preparation of the marking composition of the present invention, it is preferable to use a photo-initiator for curing the resin. There can be used the known photo-initiators such as thioxanethone type, anthraquinone type, acetophenone type, benzoin ether type and benzophenone type for the radical polymerization resins and the known photo-initiators such as aromatic diazonium salts, aromatic halonium salts, aromatic sulfonium salts and metallocene compounds for the cationic polymerization resins. These photo-initiators may be used either singly or as a mixture of two or more of them. In case a cationic polymerization type resin is used as the energy ray curing resin, the composition comprising such a resin is heated at a temperature in the range of preferably 80° C. to 170° C., more preferably 100° C. to 150° C. for effecting perfect curing of the resin. The heating time is variable depending on the temperature used, but it is usually 5 to 30 minutes.

The leuco dye used in this invention is preferably one with low solubility in toluene. Examples of such leuco dyes are those represented by the formula (1) and 2,2-bis(4-(6'-(N-cyclohexyl-N-methylamino)-3'-methylspiro(phthalide-3,9'-xanethene)-2'-ylamino)-phenyl)propane (Papirol SD-120 produced by Showa Denko KK; solubility in toluene at 25° C.: 0.055 w/v %). Examples of the leuco dyes represented by the formula (1) include 3-diethylamino-7-o-fluoroanilinofluoran, 3-dimethylamino-7-o-fluoroanilinofluoran, 3-diethylamino-7-p-fluoroanilinofluoran, 3-dimethylamino-7-p-fluoroanilinofluoran, 3-diethylamino-7-o-chloroanilinofluoran, 3-diethylamino-7-p-chloroanilinofluoran, 3-diethylamino-7-p-chloro-o-fluoroanilinofluoran, 3-dimethylamino-7-p-fluoro-o-chloroanilinofluoran, and 3-diethylamino-7-2',4'-dichloroanilinofluoran. Of these leuco dyes, 3-diethyl-7-o-fluoroanilinofluoran (solubility in toluene at 25° C.: 1.14 w/v %), 3-dimethylamino-7-o-fluoroanilinofluoran, 3-diethylamino-7-o-chloroanilinofluoran and 3-diethylamino-7-p-chloroanilinofluoran are especially preferred. It is desirable to select a leuco dye whose solubility in toluene at 25° C. is below 5 w/v % (weight/volume %, hereinafter the same), more preferably below 3 w/v %, even more preferably below 2 w/v %. These fluoran compounds are also low in solubility in energy ray curing resins, and this is considered conducive to prevention of discoloration of the ground. If the amount of the leuco dye used is too small, it is impossible to obtain a clear-cut mark. If this dye is used in an excess amount, no further betterment of clearness of the mark formed is provided, resulting in poor economy. It is therefore recommended to use a leuco dye in an amount of about 5 to 50 wt %, preferably about 7 to 45 wt % based on the energy ray curing resin.

The color developers usable in the present invention include sulfonylphenol type color developers such as 4,4'-sulfonyldiphenol (insoluble in toluene; solubility in water at 25° C.: 1,000 ppm), bis(3-allyl-4-hydroxyphenyl)sulfone (insoluble in toluene; solubility in water at 25° C.: 5 ppm), 2,2',6,6'-tetramethyl-4,4'-sulfonyldiphenol (insoluble in toluene and water), 2,2',6,6'-tetrabromo-4,4'-sulfonyldiphenol-(insoluble in toluene and water) and 4-(4'-isopropoxyphenyl)sulfonylphenol (solubility in toluene at 65° C.: 2,000 ppm; solubility in water at 25° C.: 1,980 ppm); methylenebisphenol type color developers such as 4,4'-isopropylidenediphenol (solubility in toluene at 65° C.=7,000 ppm; solubility in water at 25° C.: 3,800 ppm), bis(p-hydroxyphenyl)methane and 1,1-bis-(p-hydroxyphenyl)-cyclohexane; hydrocarbon-based monophenol type color developers such as p-octylphenol and p-phenylphenol; and phenolic aromatic carboxylic acid derivatives such as benzyl p-hydroxybenzoate, dimethyl 4-hydroxyphthalate, diethyl 5-hydroxyisophthalate, 3,5-ditert-butylsalicylic acid, salicylic acid and benzyl β-hydroxynaphthalenecarboxylate, and polyvalent metal salts of phenolic aromatic carboxylic acids. Sulfonylphenol type color developers are preferred, and 4,4'-sulfonyldiphenol type color developers having a substitutent(s) in the phenol nucleus are more preferred. The substituent(s) may be, for instance, a $C_{1-5}$ alkyl group such as methyl, etc., a halogen atom such as bromium or an allyl group. The number of the substituents is 1 to 4, preferably 1 to 2, per one phenol nucleus, and such substituent is preferably at the ortho-position of the hydroxyl group of the phenol nucleus.

The phenol polymers of the type insoluble in toluene and water are also usable as color developer in the present invention. Examples of such phenol polymers include p-vinylphenol homopolymers (MARUKA LYNCUR M, produced by Maruzen Sekiyu Kagaku KK), p-vinylphenol and 2-hydroxyethyl methacrylate copolymer (MARUKA LYNCUR CHM, produced by Maruzen Sekiyu kagaku KK), p-vinylphenol and methyl methacrylate copolymer (MARUKA LYNCUR CMM, produced by Maruzen Sekiyu Kagaku KK), bromide of poly-p-vinylphenl (MARUKA LYNCUR MB, produced by Maruzen Sekiyu Kagaku KK), p-vinylphenol and styrene copolymer (MARUKA LYNCUR CST, produced by Maruzen Sekiyu Kagaku KK), poly-p-vinylphenols such as p-vinylphenol and phenylmaleimide copolymer, p-vinylphenol and maleic acid copolymer and p-vinylphenol and fumaric acid copolymer (these polymers are the products by Maruzen Sekiyu Kagaku KK), dicyclopentadiene and phenol copolymer, dicyclopentadiene and cresol copolymer, and dicyclopentadiene and diphenol copolymer.

Of these color developers, those with low solubility in toluene are preferred. Specifically, the color developers whose solubility in toluene at 65° C. is preferably below 10,000 ppm, more preferably below 5,000 ppm, even more preferably below 3,000 ppm, are suited for use in this invention. In case the composition of this invention is applied to the articles which are required to have scratch resistance, such as the flexible articles like packaging sheets, or the articles which are subject to frictional contact with each other at the marked portions, use of a 4,4'-sulfonyldiphenol type color developer having a substitutent or a phenol polymer type color developer is recommended. In case the composition is applied to the articles which are required to have hot water resistance, such as the articles subjected to a hydrothermal sterilization treatment like milk or other beverage packs, use of a color developer scarcely soluble in water (for example a color developer whose solubility in water at 25° C. is below 3 ppm) is suggested. These color developers may be used either singly or as a combination of two or more of them. In the present invention, the color developer is used in an amount of 30 to 300 wt %, preferably 50 to 200 wt % based on the leuco dye. The most preferable color developers for use in this invention are those which are scarcely soluble in toluene and water, for instance, phenol polymers such as 2,2',6,6'-tetramethyl-4,4'-sulfonyldiphenol, 2,2',6,6'-tetrabromo-4,4'-sulfonyldiphenol and poly-p-vinylphenols.

The laser marking composition of the present invention may contain other additives as required. Examples of such additives include sensitizer for increasing color sensitivity, filler, colorant, dispersant, fluidity adjustor, releasing agent, flame retardant, lubricant, light stabilizer, antioxidant and other materials usually used for ultraviolet curing resin coating.

The sensitizers usable in this invention include higher fatty acid amides such as stearic acid amide, animal waxes such as beeswax and shellac wax, vegetable waxes such as carnauba wax, mineral waxes such as montan wax, paraffin waxes, petroleum waxes, higher fatty acid esters, chlorinated paraffin, synthetic paraffin, acetoacetic anilides, diphenylamines, carbazoles, fatty acid anilides, carboxylic acid esters such as dimethyl terephthalate and diphenyl terephthalate, sulfonic acid amides such as benzenesulfonic acid anilide, sulfonic acid esters such as phenoxyethyl p-toluenesulfonate and phenyl benzenesulfonate, diphenylsulfones such as bis(4-allyloxyphenyl)sulfone and bis-(4-pentylphenyl)sulfone, naphthol derivatives such as 1-benzyloxynaphthalene and 2-benzoyloxynaphthalene, urea derivatives such as N-stearylurea, and diketone compounds such as 4-acetylacethophenone and octadecane-2,17-dione. The sensitizer is used in an amount of usually 0.5 to 2 parts to one part of color developer.

The fillers usable in this invention include inorganic fillers such as calcium carbonate, silica, alumina, mica, calcium silicate, clay, talc, glass fiber, carbon fiber, etc., and organic fillers such as polyethylenes, polyamides, epoxy resins, guanamine resins, etc. As colorant, there can be used various types of organic pigments such as carbon black, phthalocyanine, monazo, disazo, quinacridone, anthraquinone, flavanthrone, perinone, perylene, dioxazine, condensed azo, azomethine, methine, etc., and inorganic pigments such as titanium oxide, lead sulfate, zinc oxide, iron black, chrome yellow, zinc yellow, chrome vermilion, red oxide, cobalt purple, ultramarine, prussian blue, chrome green, cobalt green, etc. The filler is used usually in such an amount that it will not exceed 80 w/w % of the overall solid content, while the colorant is used in such an amount that it will hold not more than 3 w/w % of the overall solid content.

The marking composition of the present invention comprises a "leuco dye ink" prepared by mixing an ultraviolet curing resin, a leuco dye and, if necessary, other additives such as sensitizer, filler, colorant, dispersant, fluidity adjustor, releasing agent, flame retardant, lubricant, light stabilizer, antioxidant, etc., by using a suitable stirring means, for example a three-roll ink mill, at a temperature of preferably 15° to 30° C., and a "color developing ink" prepared by mixing an ultraviolet curing resin, a color developer and, if necessary, other additives such as sensitizer, filler, colorant, dispersant, fluidity adjustor, releasing agent, flame retardant, lubricant, light stabilizer, antioxidant, etc., by using a stirring means such as a three-roll ink mill at a temperature of preferably 5° to 30° C. The two inks are mixed uniformly when used.

A preferred mode of carrying out the laser marking method according to the present invention is described below. The marking composition of this invention is coated on the substrate to be marked (usually the composition is coated so that the coating thickness after drying will be 10 to 100 μm), then the energy rays are applied to the coating for curing it, and after molding as desired, the laser beams such as carbon dioxide laser beams, YAG laser beams or excimer laser beams are applied to the surface of the coated substrate. Black marking with a vivid contrast is formed in the beam-applied area. The quantity of laser beams to be applied is 0.5 to 6 J/cm$^2$ in the case of pulse type carbon dioxide laser. The substrates that can be subjected to the above marking according to the present invention include plastic films made of polyester such as polyethylene terephthate or polybutylene terephthalate, vinylchloride, polyethylene, polypropylene, etc., plastic plates made of said materials or a resin such as acrylic resin or ABS resin, metal plates such as aluminum, iron, etc., and papers such as metallized paper, coated paper, synthetic paper, etc.

The marking composition of the present invention can be used for marking the maker's name, contents, date of production, lot number, etc., on the surfaces of the sheets, packaging sheets, cards, labels, various types of containers of foods, medicines, etc., such as bottles, metal-made cans, etc., caps of such containers and others.

EXAMPLES

The present invention will be further illustrated with reference to the examples, which examples, however, are merely intended to be illustrative and not to be construed as limiting the scope of the invention. The materials used in the following Examples and Comparative Examples are as listed below.

A: epoxy acrylate (KAYARAD R-011 produced by Nippon Kayaku KK)
B: triacrylate (KAYARAD TMPTA produced by Nippon Kayaku KK)
C: monoacrylate (KAYARD 2-HEMA produced by Nippon Kayaku KK)
D: 1-hydroxycyclohexyl phenyl ketone
E: 2,4-diethylthioxanthone
F: 2-ethylanthraquinone
G: 1,4-dimethoxybenzene
H: fluidity adjustor (goods name: Muda Flow, produced by Monsanto Chemical Co.)
I: diallyl phthalate resin
J: 3,3-diethylamino-7-o-fluoroanilinofluoran (solubility in toluene at 25° C.: 1.14 w/v %)
K: 3,3-diethylamino-7-o-chloroanilinofluoran (solubility in toluene at 25° C.: 0.8 w/v %)
L: 3,3-dibutylamino-6-methyl-7-anilinofluoran (solubility in toluene at 25° C.: 17.5 w/v %)
M: 3,3-dibutylamino-7-o-fluoroanilinofluoran (solubility in toluene at 25° C.: 10.5 w/v %)
N: bis(3-allyl-4-hydroxyphenyl)sulfone (insoluble in toluene; solubility in water at 25° C.: 5 ppm)
O: 4,4'-sulfonyldiphenol (insoluble in toluene; solubility in water at 25° C.: 1,000 ppm)
P: 4,4'-isopropylidenediphenol (solubility in toluene at 65° C.: 7,000 ppm; solubility in water at 25° C.: 3,800 ppm)
Q: 2,2',6,6'-tetramethyl-4,4'-sulfonyldiphenol (insoluble in toluene and water)
R: 2,2',6,6'-tetrabromo-4,4'-sulfonyldiphenol (insoluble in toluene and water)
S: bromide of poly-p-vinylphenol (MARUKA LYNCUR MB, produced by Maruzen Sekiyu Kagaku KK, insoluble in toluene and water; softening point: 210° C.)
T: 4-(4'-isopropoxyphenyl)sulfonylphenol (solubility in toluene at 65° C.: 2,000 ppm; solubility in water at 25° C.: 1,980 ppm)
U: 2,2-bis(4-(6'-(N-cyclohexyl-N-methylamino)-3'-methylspiro(phthalide-3,9'-xanthene)-2'-ylamino)-phenyl)propane (solubility in toluene at 25° C.: 0.055 w/v %).

Examples 1–11 and Comparative Examples 1–2

The materials (resins, color former or developer and additives) were uniformly mixed according to the formulations shown in Table 1 by using a three-roll mill to obtain (a) "leuco dye ink" and (b) "color developing ink", and the two inks were uniformly mixed at a ratio of 1:1 ((a)/(b)=½ in Example 3) to obtain the marking compositions of the present invention. In Comparative Examples 1 and 2, the marking compositions were obtained by using as color former a leuco dye not low in solubility in toluene. Each of the thus obtained marking compositions was coated on an iron plate by a bar coater so that the coating thickness after drying would become 20 μm, and then ultraviolet rays were applied thereto from a high pressure mercury lamp to cure the composition, thus preparing a test piece. Laser beams were applied to this test piece by a pulse type carbon dioxide laser irradiator (BLAZAR 6000 mfd. by Laser Technics, Ltd.; energy density: 3 J/cm$^2$). Clear-cut black marks were obtained in Examples 1–11, but no such clear-cut black mark could be obtained in Comparative Examples 1–2. The figures in Table 1 are parts by weight.

TABLE 1

|  |  | Resin | | | Color | Color | Additives | | | | | |
| --- | --- | --- | --- | --- | --- | --- | --- | --- | --- | --- | --- | --- |
|  | Ink | A | B | C | former | developer | D | E | F | G | H | I |
| Example No. | | | | | | | | | | | | |
| 1 | (a) | 60 | 40 | | J:30 | | 3 | 0.3 | | 0.3 | 1 | |
|  | (b) | 60 | 40 | | | N:30 | 3 | 0.3 | | 0.3 | 1 | |
| 2 | (a) | 60 | 40 | | J:30 | | 3 | 0.3 | | 0.3 | 1 | |
|  | (b) | 60 | 40 | | | O:30 | 3 | 0.3 | | 0.3 | 1 | |
| 3 | (a) | 70 | | 30 | J:20 | | 3 | | 2 | 0.3 | 1 | 5 |
|  | (b) | 70 | | 30 | | P:20 | 3 | | 2 | 0.3 | 1 | 5 |
| 4 | (a) | 60 | 40 | | K:30 | | 3 | 0.3 | | 0.3 | 1 | |
|  | (b) | 60 | 40 | | | N:30 | 3 | 0.3 | | 0.3 | 1 | |

TABLE 1-continued

|   | Ink | Resin A | B | C | Color former | Color developer | Additives D | E | F | G | H | I |
|---|---|---|---|---|---|---|---|---|---|---|---|---|
| 5 | (a) | 60 | 40 |   | J:30 |   | 3 | 0.3 |   | 0.3 | 1 |   |
|   | (b) | 60 | 40 |   |   | Q:30 | 3 | 0.3 |   | 0.3 | 1 |   |
| 6 | (a) | 60 | 40 |   | J:30 |   | 3 | 0.3 |   | 0.3 | 1 |   |
|   | (b) | 60 | 40 |   |   | R:30 | 3 | 0.3 |   | 0.3 | 1 |   |
| 7 | (a) | 60 | 40 |   | K:30 |   | 3 | 0.3 |   | 0.3 | 1 |   |
|   | (b) | 60 | 40 |   |   | Q:20,R:10 | 3 | 0.3 |   | 0.3 | 1 |   |
| 8 | (a) | 60 | 40 |   | J:30 |   | 3 | 0.3 |   | 0.3 | 1 |   |
|   | (b) | 60 | 40 |   |   | S:30 | 3 | 0.3 |   | 0.3 | 1 |   |
| 9 | (a) | 60 | 40 |   | J:15,K:15 |   | 3 | 0.3 |   | 0.3 | 1 |   |
|   | (b) | 60 | 40 |   |   | T:30 | 3 | 0.3 |   | 0.3 | 1 |   |
| 10 | (a) | 60 | 40 |   | U:30 |   | 3 | 0.3 |   | 0.3 | 1 |   |
|   | (b) | 60 | 40 |   |   | N:30 | 3 | 0.3 |   | 0.3 | 1 |   |
| 11 | (a) | 70 |   | 30 | J:20 |   | 3 |   | 2 | 0.3 | 1 | 5 |
|   | (b) | 70 |   | 30 |   | R:20 | 3 |   | 2 | 0.3 | 1 | 5 |
| Comp. Example |   |   |   |   |   |   |   |   |   |   |   |   |
| 1 | (a) | 60 | 40 |   | L:30 |   | 3 | 0.3 |   | 0.3 | 1 |   |
|   | (b) | 60 | 40 |   |   | N:30 | 3 | 0.3 |   | 0.3 | 1 |   |
| 2 | (a) | 60 | 40 |   | M:30 |   | 3 | 0.3 |   | 0.3 | 1 |   |
|   | (b) | 60 | 40 |   |   | N:30 | 3 | 0.3 |   | 0.3 | 1 |   |

Performance Test Results

Laser beams were applied to the test pieces obtained in Examples 1–11 and Comparative Examples 1–2 by using a pulse type carbon dioxide laser irradiator (BLAZAR 6000 mfd. by Laser Technics, Ltd.; energy density: 3 J/cm$^2$) to form a black mark on each test piece, and evaluation was made on 1) discoloration of the ground, 2) developed color density, 3) vividness, 4) scratch resistance, 5) water resistance, 6) hot water resistance and 7) plasticizer resistance of each test piece. The test results are shown in Table 2.

TABLE 2

| Example | 1) | 2) | 3) | 4) | 5) | 6) | 7) |
|---|---|---|---|---|---|---|---|
| Example |   |   |   |   |   |   |   |
| 1 | 0.13 | 1.30 | O | O | 1.30 | X | 1.29 |
| 2 | 0.13 | 1.25 | O | X | 1.27 | X | 1.25 |
| 3 | 0.13 | 1.23 | O | X | 1.20 | X | 1.21 |
| 4 | 0.11 | 1.22 | O | O | 1.20 | X | 1.20 |
| 5 | 0.10 | 1.15 | O | O | 1.15 | O | 1.15 |
| 6 | 0.10 | 1.20 | O | O | 1.20 | O | 1.18 |
| 7 | 0.10 | 1.20 | O | O | 1.20 | O | 1.18 |
| 8 | 0.08 | 1.00 | O | O | 1.01 | O | 1.01 |
| 9 | 0.10 | 1.30 | O | X | 1.30 | X | 1.28 |
| 10 | 0.10 | 1.22 | O | O | 1.21 | O | 1.20 |
| 11 | 0.11 | 1.24 | O | O | 1.23 | O | 1.19 |
| Comp. Example |   |   |   |   |   |   |   |
| 1 | 0.60 | 1.31 | X | O | 1.30 | X | 1.29 |
| 2 | 0.53 | 1.30 | X | O | 1.25 | O | 1.23 |

1) The discoloration of the ground

After curing of the coated composition, the developed color density of each test piece before laser beam irradiation was measured by a Macbeth reflection densitometer RD-914. The figures shown are the measured values of color density.

2) Developed color density

The developed color density of the marking portion of each test piece was measured by a Macbeth reflection densitometer RD-914.

3) Vividness

Legibility of the mark was judged visually. o: good vividness; x: poor vividness. (Generally, the smaller the discoloration of the ground and the higher the developed color density, the better is the vividness.)

4) Scratch resistance

After curing, the test piece before laser irradiation was scratched with a nail, and it was visually checked whether a tinted scar was left or not on the ground. o: not tinted x: tinted.

5) Water resistance

The marked test piece was immersed in tap water of room temperature for 72 hours and then the developed color density of the mark portion was measured by said Macbeth reflection densitometer.

6) Hot water resistance

The marked test piece was immersed in hot water of 80° C. for 30 minutes and then the state of fading of color of the mark portion was visually observed. o: No fading of color occurred; x: Color disappeared perfectly.

7) Plasticizer resistance

The marked test piece was sandwiched between the PVC wrapping films and left at 40° C. under pressure of 300 gr/cm$^2$ for 15 hours, and then the developed color density of the mark portion was measured by said Macbeth reflection densitometer.

As is seen from the data of vividness shown under 3) in Table 2, good vividness of marks was obtained in the Examples, attesting to the suitableness of the compositions of the present invention for laser marking. That is, the compositions of the Examples are far superior to those of the Comparative Examples in vividness of the marks formed, which is endorsed by the large ratio of the developed color density of the laser non-applied portion shown under 1) in Table 2 to the developed color density of the laser applied portion shown under 2) in Table 2, which ratio is around 2:1 in the Comparative Examples whereas it is around 10:1 in the Examples. Comparing Examples 1, 4 and 10 with Comparative Examples 1–2 in all of which the same color developer was used, it is noted that the solubility in toluene, at 25° C., of the leuco dyes used as color former in the Examples is below 2% while that of the leuco dyes used as color former in the Comparative Examples is above 10%, which shows that the above-described effect of the present invention depends on the use of the leuco dyes which are low in solubility in toluene.

Referring to the data on scratch resistance shown under 4) in Table 2, it is seen that the test results of Examples 1, 4–8, 10 and 11 are better than those of Examples 2, 3 and 9. From the comparison of Example 1 with 2, Example 3 with 11, etc., the above result is obviously attributable to the effect of the color developer.

Looking at the test results on hot water resistance shown under 6) in Table 2, it is noted that the test results of Examples 5–8, 10 and 11 are better than those of Examples 1–4 and 9. Although no significant difference was seen in water resistance at normal temperature as shown under 5) in Table 2, the test piece has lost its color in the latter Examples when the test piece was immersed in hot water. This phenomenon is accounted for by the fact that the solubility in water of the color developers used in the latter Examples increased sharply with rise of temperature, causing the developer to dissolve in hot water, while no such phenomenon took place in the former Examples.

INDUSTRIAL APPLICABILITY

According to the present invention, there are provided a marking composition capable of forming a vivid black color on irradiation with laser beams while causing no or only limited discoloration of the ground and a marking composition capable of forming a vivid black color with excellent fastness, and a laser making method using such compositions. Thus, the industrial applicability of the present invention is considered high.

We claim:

1. A marking composition comprising an ultraviolet ray curing resin, a photo-initiator, a leuco dye with low solubility in toluene and a color developer with low solubility in toluene; said leuco dye with low solubility in toluene being one whose solubility in toluene at 25° C. is 2 w/v % or below, and said color developer with low solubility in toluene being one whose solubility in toluene at 60° C. is 10,000 ppm or below.

2. A marking composition according to claim 1, wherein the leuco dye is a fluoran compound represented by the formula (1):

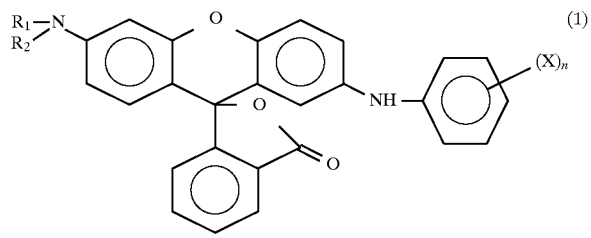

wherein $R_1$ and $R_2$ are methyl or ethyl group; X is fluorine or chlorine; and n is an integer of 0 to 2.

3. A marking composition according to claim 1, wherein the leuco dye is 2,2'-bis(4-(6'-(N-cyclohexyl-N-methylamino)-3'-methylspiro(phthalide-3,9'-xanthene)-2'-ylamino)phenyl)propane.

4. A marking composition according to claim 1, wherein the color developer is one having low solubility in toluene, with solubility thereof in water at 25° C. being 3 ppm or below.

5. A marking composition according to claim 4, wherein the color developer having low solubility in toluene, with solubility thereof in water at 25° C. being 3 ppm or below, is 2,2',6,6'-tetramethyl-4,4'-sulfonyl-diphenol, 2,2',6,6'-tetrabromo-4,4'-sulfonyldiphenol or a phenol polymer.

6. A marking composition containing at least one of ultraviolet curing resin, leuco dye set forth in claim 2 or color developer set forth in claim 5.

7. A marking composition containing at least one of ultraviolet curing resin, leuco dye set forth in claim 3 or color developer set forth in claim 5.

8. The marking composition according to claim 5, wherein the phenol polymer is a poly-p-vinylphenol.

* * * * *